US010637825B2

United States Patent
Novo Diaz et al.

(10) Patent No.: US 10,637,825 B2
(45) Date of Patent: Apr. 28, 2020

(54) ROUTER AND METHOD FOR CONNECTING AN IPV4 NETWORK AND AN IPV6 NETWORK

(71) Applicant: Telefonaktiebolaget LM Ericsson (publ), Stockholm (SE)

(72) Inventors: Oscar Novo Diaz, Helsinki (FI); Nicklas Beijar, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/064,731

(22) PCT Filed: Dec. 22, 2015

(86) PCT No.: PCT/SE2015/051391
§ 371 (c)(1),
(2) Date: Jun. 21, 2018

(87) PCT Pub. No.: WO2017/111677
PCT Pub. Date: Jun. 29, 2017

(65) Prior Publication Data
US 2019/0020622 A1    Jan. 17, 2019

(51) Int. Cl.
*H04J 3/22* (2006.01)
*H04L 29/12* (2006.01)
(Continued)

(52) U.S. Cl.
CPC ........ *H04L 61/251* (2013.01); *H04L 61/1541* (2013.01); *H04L 61/256* (2013.01);
(Continued)

(58) Field of Classification Search
CPC ......... H04L 69/08; H04L 69/18; H04L 69/22; H04L 12/4633; H04L 49/602
See application file for complete search history.

(56) References Cited

U.S. PATENT DOCUMENTS

2002/0021706 A1* 2/2002 Tsuchiya ................. H04L 12/66
370/401
2003/0187882 A1* 10/2003 Jinmei ................. H04L 29/1216
(Continued)

FOREIGN PATENT DOCUMENTS

EP         2472811 A1    7/2012
WO    2011135405 A1   11/2011

OTHER PUBLICATIONS

Shelby, Z., "Constrained RESTful Environments (CoRE) Link Format", Internet Engineering Task Force (IETF), Request for Comments: 6690, Category: Standards Track, Aug. 2012, 1-22.
(Continued)

*Primary Examiner* — Un C Cho
*Assistant Examiner* — Atique Ahmed
(74) *Attorney, Agent, or Firm* — Murphy, Bilak & Homiller, PLLC

(57) ABSTRACT

The present disclosure discloses a method (400) performed by a router connected to an IPv6 network and an IPv4 network. The method comprises receiving (S410), from an IPv4 compliant device connected to the IPv4 network, a request for an IPv6 network resource enabled by an IPv6 compliant device connected to the IPv6 network, and obtaining (S420) from a first resource directory an external IPv4 address and an external IPv4 port number corresponding to the IPv6 network resource. The first resource directory comprises a name, a local IPv6 address and a local IPv6 port for the IPv6 network resource, the external IPv4 address, and the external IPv4 port number. The method (400) further comprises creating (S430) an entry in a network address translation table for enabling communication between the IPv4 compliant device and the IPv6 network resource. The entry comprises the external IPv4 address, the external IPv4 port number, the local IPv6 address and the local IPv6 port number for the IPv6 network resource, and a local IPv4

(Continued)

address and a local IPv4 port for the IPv4 compliant device. The method further comprises transmitting (S440) the external IPv4 address and the external IPv4 port number to the IPv4 compliant device.

20 Claims, 8 Drawing Sheets

(51) Int. Cl.
  *H04L 29/06* (2006.01)
  *H04W 8/00* (2009.01)
  *H04W 4/70* (2018.01)
(52) U.S. Cl.
  CPC ........ *H04L 61/2517* (2013.01); *H04L 69/167* (2013.01); *H04W 8/005* (2013.01); *H04W 4/70* (2018.02)

(56) References Cited

U.S. PATENT DOCUMENTS

| | | | | |
|---|---|---|---|---|
| 2004/0179508 A1* | 9/2004 | Thubert | ................ | H04L 29/06 370/349 |
| 2004/0190549 A1* | 9/2004 | Huitema | ........... | H04L 29/12358 370/466 |
| 2006/0133390 A1* | 6/2006 | Sreekantiah | ............ | H04L 45/02 370/401 |
| 2006/0187855 A1* | 8/2006 | Booth, III | ........... | H04L 41/0253 370/254 |
| 2008/0168181 A1 | 7/2008 | Berkvens et al. | | |
| 2008/0240131 A1* | 10/2008 | Sehgal | .............. | H04L 29/12547 370/401 |
| 2010/0217890 A1 | 8/2010 | Nice et al. | | |
| 2011/0103394 A1* | 5/2011 | Vogt | .................. | H04L 29/12367 370/401 |
| 2013/0223230 A1* | 8/2013 | Swaminathan | ....... | H04W 76/12 370/241 |
| 2017/0237835 A1* | 8/2017 | Savolainen | ........... | H04L 61/251 709/245 |

OTHER PUBLICATIONS

Shelby, Z. et al., "CoRE Resource Directory", CoRE Internet-Draft, Intended status: Standards Track, Jul. 6, 2015, 1-49.

Castellani, A, et al., "Best practices for HTTP-CoAP mapping implementation", CoRE Working Group Internet-Draft, University of Padova, Apr. 27, 2012, pp. 1-42.

Rajtar, B, et al., "Framework for accessing IPv6 content for IPv4-only clients", Behave WG, Internet-Draft, Jul. 15, 2013, pp. 1-7.

Xie, C, et al., "The Approach for IPv4-only users to access IPv6-only Content", Network Working Group, Internet-Draft, Huawei Technologies, Jul. 29, 2013, pp. 1-10.

* cited by examiner

Fig 3

RD Table

| | ID | Resource | IPv4 external address | Port | IPv6 network resource address | Port |
|---|---|---|---|---|---|---|
| NAT for Resources | 4521 | sensors/temp1 | 74.12.43.10 | 61616 | FE80::8329 | 5683 |
| | 4522 | sensors/temp2 | 74.12.43.10 | 61617 | FE80::8359 | 5683 |
| | 4523 | node/humidity | 74.12.43.10 | 61617 | FE80::8359 | 5683 |
| | | | | | | |

NAT Table

| | IPv4 compliant device address and port | IPv4 external address and port | IPv6 internal address and port | IPv6 network resource address and port |
|---|---|---|---|---|
| Dynamic incoming NATing | 205.34.21.01:80 | 74.12.43.10:61616 | FE80::8326:5683 | FE80::8329:5683 |
| | 85.20.12.80:80 | 74.12.43.10:61617 | FE80::8326:5683 | FE80::8359:5683 |
| | 113.23.45.65:80 | 74.12.43.10:61617 | FE80::8326:5683 | FE80::8359:5683 |
| Dynamic outgoing NATing | | | | |
| | 74.12.43.10:5080 | 74.12.43.10:44534 | FE80::8326:5683 | FE80::8329:5683 |
| | 74.12.43.10:5080 | 74.12.43.10:44534 | FE80::8326:5683 | FE80::8329:5683 |

ROUTER AND METHOD FOR CONNECTING AN IPV4 NETWORK AND AN IPV6 NETWORK

TECHNICAL FIELD

The present disclosure relates to a method performed by a router connected to an Internet Protocol Version 6 (IPv6) network and an Internet protocol Version 4 (IPv4) network, a router for connecting an IPv4 network and an IPv6 network, a corresponding computer program, and a corresponding computer program product.

BACKGROUND

One of the most important functions of the Internet Protocol (IP) is the interconnection of heterogeneous links into a single interoperable network. This is equally true for constrained networks in IoT, where there are many wireless (and also wired) link-layer technologies in use. In respect to that, Internet of Things (IoT) refers to the interconnection of constrained devices with the Internet. The IoT environment will have multiple constrained devices operating in a constrained network.

Typically, a constrained network has limited packet sizes, may exhibit a high degree of packet loss, and may have a substantial number of devices with constrained capabilities (such as Central processing unit (CPU) or memory). These networks and the devices nodes within them are characterized by severe limitations on throughput and available power.

In the majority of constrained networks, each constrained device is identified by a unique IPv6 address, and is capable of sending and receiving IPv6 packets. Typically constrained networks such as 6LoWPAN support IPv6 traffic and use the user datagram protocol (UDP) as a transport protocol.

IPv6 over Low-Power Wireless Personal Area Networks (6LoWPANs) are an example of a constrained network. The 6LoWPAN architecture is made up of low-power wireless area networks, which are IPv6 stub networks. A stub network is a network which IP packets are sent from or destined to, but which does not act as a relay to other networks and has no knowledge of other networks around it.

A 6LoWPAN network is the collection of IPv6 devices which share a common IPv6 address prefix (in the majority of the cases the first 64 bits of an IPv6 address), meaning that regardless of where a node is in a 6LoWPAN network, its IPv6 address remains the same. A simple 6LoWPAN is connected through one 6LoWPAN Edge Router to another IP network. An Extended 6LoWPAN network encompasses multiple edge routers interconnected with a backbone link (e.g., Ethernet).

6LoWPAN networks are connected to other IP networks through edge routers. The Edge Router plays an important role as it routes traffic in and out of the 6LoWPAN network, while handling compression and Neighbor Discovery (ND) for the 6LoWPAN network. If the 6LoWPAN network is to be connected to an IPv4 network, the Edge Router will also handle IPv6-to-IPv4 interconnectivity. Edge Routers typically have management features tied into overall network management solutions. Multiple Edge Routers can be supported in the same 6LoWPAN network if they share a common backbone link.

One important feature offered by the 6LoWPAN networks is the discovery of IoT resources. In many IoT scenarios, direct discovery of resources is not practical due to sleeping nodes, disperse networks, or networks where multicast traffic is inefficient. These problems can be solved by employing an entity called a Resource Directory (RD), which hosts descriptions of resources held on other servers, allowing lookups to be performed for those resources.

The Internet Engineering Task Force Internet (IETF) is in the process of standardizing the entity called Resource Directory that supports other nodes to discover the RD and to register, maintain, lookup, and remove, resource descriptions from the RD [IETF Internet-Draft "CoRE Resource Directory", Oct. 16, 2015, draft-ietf-core-resource-directory-05].

As stated above, constrained networks generally support only IPv6 addresses. However, it will be often necessary for the constrained devices to interact with IPv4 nodes (also referred to as IPv4 compliant devices) or across IPv4 networks. There are several ways to deal with IPv4 interconnectivity, including IPv6-in-IPv4 tunneling and address translation. These mechanisms are frequently implemented on those constrained networks. For instance, 6LoWPAN networks use Edge Routers for that purpose on the Internet.

Even though that the IPv4-IPv6 interconnectivity can be integrated in the majority of the constrained networks, there are still some cases in which the use of Network Address Translations (NATs) or tunneling is too limited, or cannot solve the routability problem between the different networks. Tunneling also adds packet overhead, makes the routes non-optimal, and requires the installation of tunnel end points.

Let's suppose the case of having an IPv6 constrained network which is connected to the IPv4 general Internet. In this case, if a node in the IPv4 network (i.e., an IPv4 compliant device hereinafter) wants to connect with a node (or the resources provided by it) in the constrained network, it needs to know its IP address. The IPv4 node could ask for the IP address of the other node to the network using Domain Name System (DNS) lookup, but the network will return an IPv6 address which the node will not know how to translate into an IPv4 route. The IPv4 node could use the Resource Directory, but the Resource Directory will return again an IPv6 address. Furthermore, the dynamic NAT methods enable communication only when the communication is originated by the network behind the NAT. Hereinafter, "the network behind the NAT" means that the NAT is controlling and translating all the incoming and outgoing traffic of that network. For example, the network behind the NAT may be an IPv6 constrained network. That limitation makes impossible that an IPv4 node in the public Internet would be able to contact or even know about the existence of an IPv6 node (also referred to as an IPv6 compliant device hereinafter) behind a NAT.

This limitation creates a lot of constraints in the IoT world since the majority of IoT constrained networks are IPv6 enabled and will be mainly connected to IPv4 compliant devices.

SUMMARY

The present disclosure proposes means for an IPv4 compliant device to establish communications with an IPv6 compliant device behind a NAT in an automated manner using a RD.

According to a first aspect, there is provided a method performed by a router connected to an IPv6 network and an IPv4 network. The method comprises: receiving, from an IPv4 compliant device connected to the IPv4 network, a request for an IPv6 network resource enabled by an IPv6 compliant device connected to the IPv6 network, and obtaining from a first resource directory an external IPv4 address and an external IPv4 port number corresponding to the IPv6 network resource. The first resource directory comprises a name, an IPv6 address, and an IPv6 port, for the IPv6 network resource, the external IPv4 address, and the external IPv4 port number. The method further comprises creating an entry in a network address translation table for enabling communication between the IPv4 compliant device and the IPv6 network resource. The entry comprises the external IPv4 address, the external IPv4 port number, the IPv6 address and the IPv6 port number for the IPv6 network resource, and an IPv4 address and an IPv4 port for the IPv4 compliant device. The method further comprises transmitting the external IPv4 address and the external IPv4 port number to the IPv4 compliant device.

In an embodiment, the external IPv4 address is an IPv4 address of the router.

In an embodiment, before receiving the request for the IPv6 network resource, the method further comprises storing the external IPv4 address and the external IPv4 port number corresponding to the IPv6 network resource in the first resource directory.

In an embodiment, the method comprises storing in the entry the IPv4 address and the IPv4 port number of the IPv4 compliant device.

In an embodiment, the method further comprises receiving, from the IPv4 compliant device, one or more packets destined to the external IPv4 address and the external IPv4 port, and forwarding the one or more packets to the IPv6 address and the IPv6 port of the IPv6 network resource.

In an embodiment, before receiving the request for the IPv6 network resource, the method further comprises receiving, from the IPv4 compliant device, a request to discover IPv6 network resources in the IPv6 network, and transmitting information about at least one of the IPv6 network resources to the IPv4 compliant device.

In an embodiment, the IPv6 network resource is indicated in a link format in the first resource directory.

In an embodiment, the first resource directory has a first identifier, and the method further comprises transmitting the first identifier to the IPv4 compliant device.

In an embodiment, the first identifier is transmitted to the IPv4 compliant device in a Hypertext Transfer Protocol (HTTP) message or a Constrained Application Protocol (CoAP) message.

According to a second aspect, there is provided a router for connecting an IPv6 network and an IPv4 network. The router comprises a receiving unit configured to receive, from an IPv4 compliant device connected to the IPv4 network, a request for an IPv6 network resource enabled by an IPv6 compliant device connected to the IPv6 network, and an obtaining unit configured to obtain from a first resource directory an external IPv4 address and an external IPv4 port number corresponding to the IPv6 network resource. The first resource directory comprises a name, an IPv6 address, and an IPv6 port, for the IPv6 network resource, the external IPv4 address, and the external IPv4 port number. The router further comprises a creating unit configured to create an entry in a network address translation table for enabling communication between the IPv4 compliant device and the IPv6 network resource. The entry comprises the external IPv4 address, the external IPv4 port number, the IPv6 address and the IPv6 port number for the IPv6 network resource, and an IPv4 address and an IPv4 port for the IPv4 compliant device. The router further comprises a transmitting unit configured to transmit the external IPv4 address and the external IPv4 port number to the IPv4 compliant device.

According to a third aspect, there is provided a router for connecting an IPv6 network and an IPv4 network. The router comprises a processor and a memory storing instructions that when executed on the processor cause the router to receive, from an IPv4 compliant device connected to the IPv4 network, a request for an IPv6 network resource enabled by an IPv6 compliant device connected to the IPv6 network, obtain from a first resource directory an external IPv4 address and an external IPv4 port number corresponding to the IPv6 network resource, the first resource directory comprising a name, an IPv6 address, and an IPv6 port, for the IPv6 network resource, the external IPv4 address, and the external IPv4 port number, create an entry in a network address translation table for enabling communication between the IPv4 compliant device and the IPv6 network resource, the entry comprising the external IPv4 address, the external IPv4 port number, the IPv6 address and the IPv6 port number for the IPv6 network resource, and an IPv4 address and an IPv4 port for the IPv4 compliant device, and transmit the external IPv4 address and the external IPv4 port number to the IPv4 compliant device.

According to a fourth aspect, there is provided a computer program comprising instructions which when executed on a router connected to an IPv6 network and to an IPv4 network, cause the router to perform the method of the first aspect.

According to a fifth aspect, there is provided a computer program product comprising a computer program and a computer readable storage medium on which the computer program is stored, and wherein the computer program comprises instructions which when executed on a router connected to an IPv6 network and an IPv4 network, cause the router to perform the method of the first aspect.

The below embodiments of the first aspect are also applicable for the remaining aspects.

By means of the embodiments described herein, an IPv4 compliant device is allowed to establish communications with an IPv6 compliant device behind a NAT. That is, the present disclosure provides means for an IPv4 network to discover IoT resources of an IPv6 network that is behind a NAT.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 shows an example of how the router stores the information, according to an embodiment described herein.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
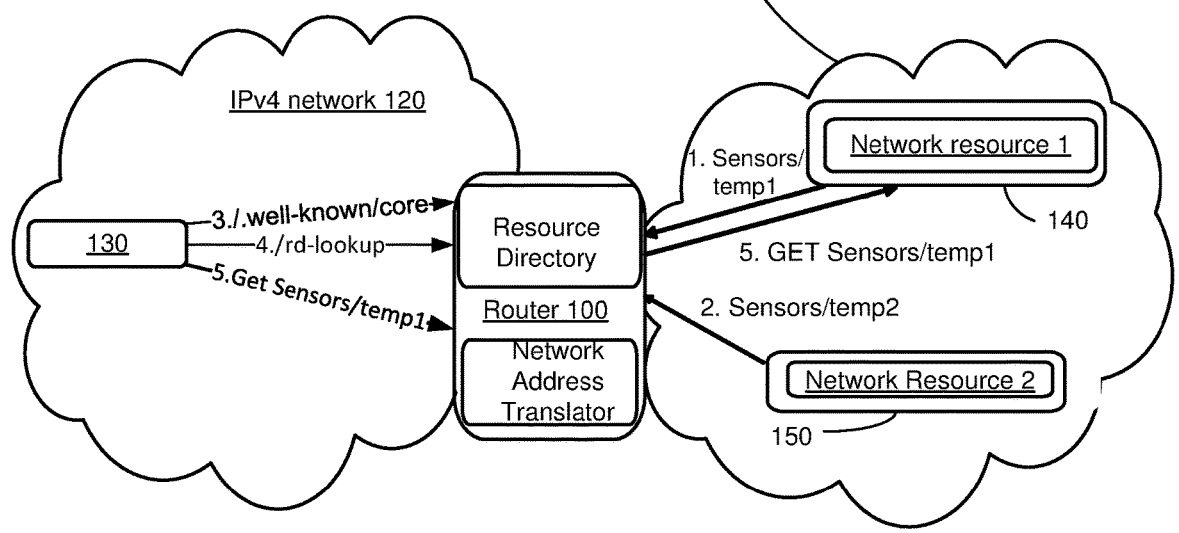
FIG. 1 illustrates a general scenario where the embodiments described herein may be applied.

FIG. 1 illustrates a general scenario where the embodiments described herein may be applied.

As shown in FIG. 1, a router 100 (e.g., an Edge Router) is used for the interconnection between a constrained network (exemplified as an IPv6 network 110, such as 6LoW-PAN) and an IPv4 network 120. The router 100 performs IP routing between a constrained network and other IP networks. The router is a necessary piece in constrained networks that want to interact with networks having different link-layer or internet-layer infrastructures. Other types of constrained IPv6 based networks that are not using 6LoW-PAN typically include a similar device, such as a gateway. In the following, the term "router" or "Edge Router" is used for these devices as well.

Furthermore, a RD and a network address translator are integrated into the router 100. The RD is used as a repository for IoT resources of the IPv6 network 110 and implements the Representational State Transfer (REST) interfaces for registration, distribution, and lookup, of those resources. Having the RD located in the router gives the possibility for nodes or devices in the IPv4 network 120 (e.g., IPv4 compliant device 130) to discover different resources in the IPv6 network 110. It should be noted that "resources in the IPv6 network" here may be also referred to as IPv6 network resources enabled or provided by an IPv6 compliant device, e.g., the IPv6 compliant device 140 or 150 as shown in FIG. 1. For example, "Network Resource 1" of the IPv6 compliant device 140 may be represented by 'sensors/temp1', which means that the IPv6 compliant device 140 acts as a sensor here and can provide temperatures as network resources. Then, the IPv4 compliant device 130 may need to access the IPv6 compliant device 140 to fetch the temperatures. In this sense, 'sensors/temp1' of the IPv6 compliant device 140 refers to an IPv6 network resource. Similarly, "Network Resource 2" of the IPv6 compliant device 150 may be represented by 'sensors/temp2', which means that the IPv6 compliant device 150 also acts as a sensor here and can provide temperatures as network resources. Although FIG. 1 illustrates that each IPv6 compliant device has one IPv6 network resource, it will be appreciated that each IPv6 compliant device may have more than one IPv6 network resource. For example, in addition to 'sensors/temp2', the IPv6 compliant device 150 may further have a network resource represented by 'node/humidity', which means that the IPv6 compliant device 150 also acts as a humidity sensor and can provide humidity as network resource. Moreover, although only two IPv6 compliant devices, i.e., the IPv6 compliant devices 140 and 150, are illustrated here, it will be appreciated that there may be more or less IPv6 compliant devices providing IPv6 network resources in the IPv6 network 110.

As shown in FIG. 1, e.g., as denoted by "5. Get Sensors/temp1" in FIG. 1, the present disclosures can allow an IPv4 network to discover IoT resources of an IPv6 network that is behind a NAT.

Figure 2:
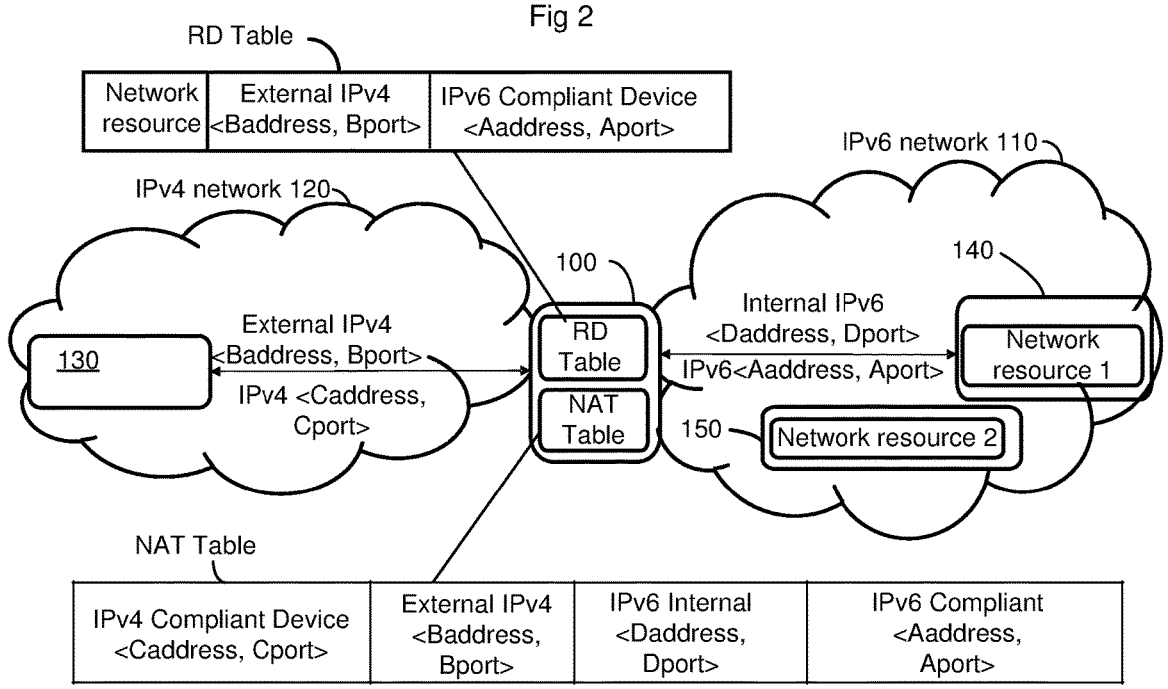
FIG. 2 illustrates a general view of the scenario shown in FIG. 1.

FIG. 2 illustrates a general view of the scenario shown in FIG. 1.

As shown in FIG. 2, the RD according to the present disclosure may implement a new table, called a RD table. The RD table may store information about the different IoT resources of the IPv6 network 110 in an <IoT resource name (network resource name), external IPv4 address and port, IPv6 address and port for the IoT resource>tuple. For example, the tuple may store the IoT resource name in a link format and the IPv6 address and port of the IPv6 compliant device having the IoT resource.

The external IPv4 address and port refers to the (external) IP address of the IPv6 compliant device in the IPv4 network. This external IPv4 address is used by the IPv4 compliant device in the IPv4 network to communicate with the IPv6 compliant device or, more specifically, to its network resources. The external IPv4 address and port may be assigned by the router to the IPv6 compliant device. Additionally, there is also the IPv6 internal address and port defined herein to refer to the IP address and port of the IPv4 compliant device in the IPv6 network. The internal IPv6 address is used by the IPv6 compliant device in the IPv6 network to communicate with the IPv4 compliant device outside the IPv6 network. Furthermore, an IPv4 address and port (without external as prefix) refers to the local IP address of the IPv4 compliant device in the IPv4 network, so may be also called as a local IPv4 address and port. Similarly, IPv6 address and port (without external as prefix) refers to the local IP address and port of the IPv6 compliant device in the IPv6 network, so may be also called as a local IPv6 address and port.

For example, as shown in FIG. 2, IPv6 address and port of the IPv6 compliant device 140 is <Aaddress, Aport>, external IPv4 address and port of the Network Resource 1 provided by the router is <Baddress, Bport>, IPv4 address and port of the IPv4 compliant device 130 is <Caddress, Cport>, and internal IPv6 address and port of the IPv4 compliant device provided by the router is <Daddress, Dport>.

Moreover, the router 100 may store the IPv6 address and IPv6 port number of the IPv6 compliant device 140 and the external IPv4 address and external IPv4 port number of the IPv6 compliant device 140 in an entry of the RD table. As well, the router may store the IPv4 address and IPv4 port number of the IPv4 compliant device 130, the IPv6 address and the IPv6 port number of the IPv6 compliant device 140, the external IPv4 address and external IPv4 port number of the IPv6 compliant device 140, and the internal IPv6 address and internal IPv6 port number of the IPv4 compliant device 130 in and entry of the NAT table.

In an implementation, the external IPv4 address here may be an IPv4 address of the router, and correspondingly the external IPv4 port may be an IPv4 port of the router.

FIG. 3 shows an example of how the router 100 stores the information according to an embodiment of the present disclosure. Once a node (e.g., the IPv6 compliant device 140 or 150 in the IPv6 network 110) registers a resource (e.g., "Network Resource 1" or "Network Resource 2"), the router assigns an IPv4 address and port to that resource and stores them in the RD table. If that node has not previously registered a resource, the router will assign a new IPv4 address and port to that resource. If the node has registered a resource in the past, the router will assign the same IPv4 address and port to the new resource. Thus, all the resources of a node will use the same IPv4 address and port to significantly reduce the number of address translations used by the RD/Router. In addition, the RD will store the IPv6 address and port of the node and it will create a new identifier (ID) to identify that resource inside the RD.

As shown in FIG. 3, it illustrates how the mapping of the new RD table can be done using the data from FIG. 1. The example shows how the IPv6 compliant device 140 has the resource 'sensors/temp1' and the IPv6 compliant device 150 has 'sensors/temp2' and 'node/humidity' as resources. The IPv6 compliant device 140 gets the IPv4 address 74.12.43.10 (which is the IPv4 address of the Edge Node) and the port 61616 while the IPv6 compliant device 150 has the same IP and port 61617.

FIG. 3 further illustrates a new NAT table, which stores information of the ongoing connections (incoming and outgoing). In particular, an entry is created in the NAT table based on the entry in the RD table for each new connection from a corresponding host on the public IPv4 network. The entry contains the tuple <IPv4 address of the corresponding host, IPv4 external address and port, IPv6 internal address and port, IPv6 address and port of the destination host>. There is a timer attached to each entry, which may be reset when traffic is forwarded based on the entry. Entries that have not been used within a timeout will be removed from the table. In contrast to ordinary NAT tables, this table has an IPv4 address on the public side while an IPv6 address on the constrained network side.

The RD/Router keeps some IPv4 and/or ports free for dynamic network address translations. The router can use those free addresses in case there is a basic NAT one-to-one communication between the nodes in the IPv6 and IPv4 networks. Consequently, the router can still provide normal network address translation (NAT) while the IoT resources behind the router are still reachable by the public Internet. Note that normal NAT only enables connections initiated from the constrained network to the public internet.

Figure 4:
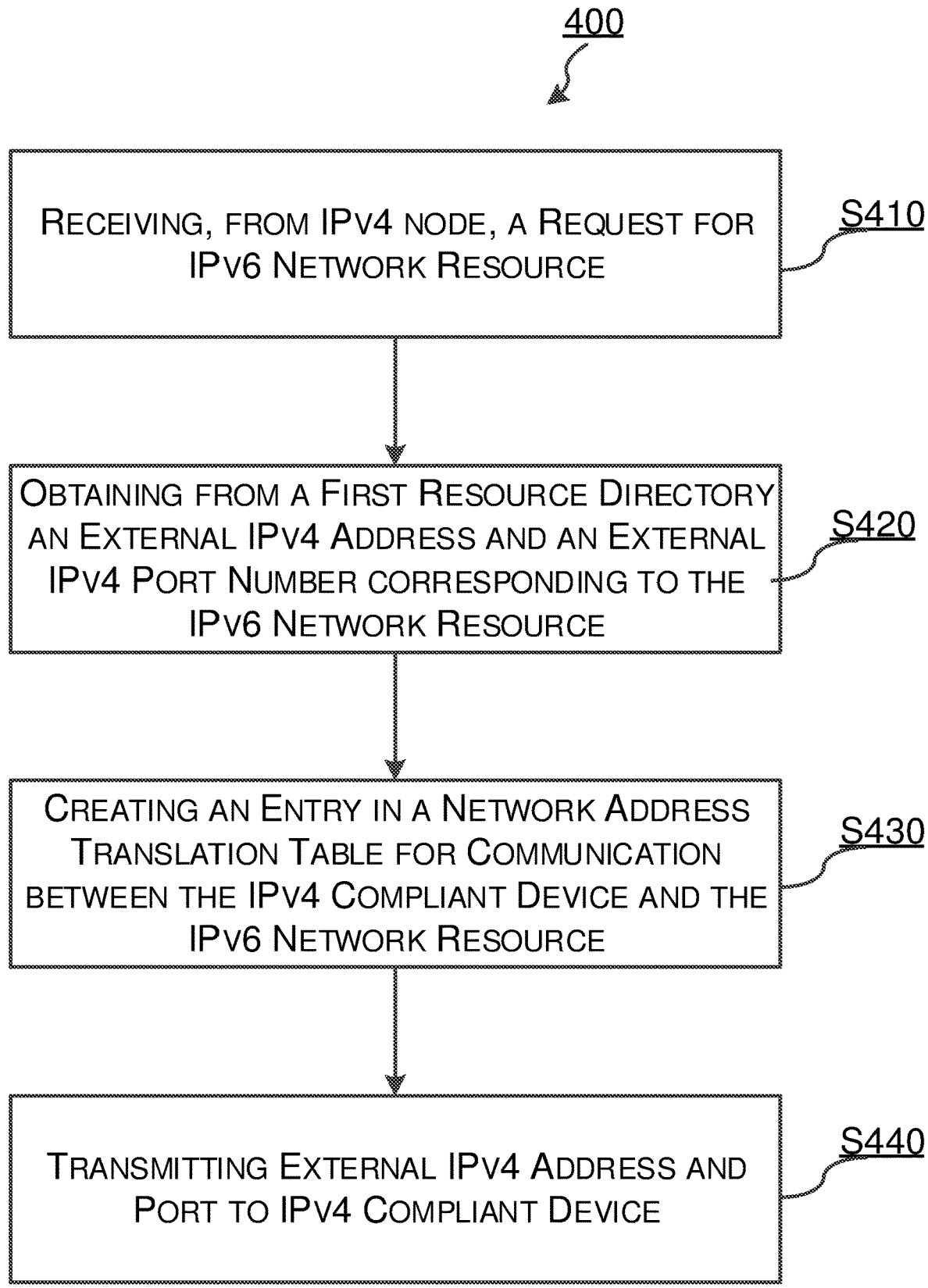
FIGS. 4-6 schematically illustrate a method performed by a router connected to an IPv6 network and an IPv4 network, according to an embodiment described herein.

FIG. 4 is a flowchart illustrating a method 400 performed by a router connected to an IPv6 network and an IPv4 network according to an embodiment of the proposed solution. The method 400 may be applied in the scenario as shown in FIG. 1. In this case, the router may be the Edge Router as shown in FIG. 1, and then the IPv6 network and the IPv4 network may be the IPv6 network 110 and the IPv4 network 120 as illustrated in FIG. 1, respectively. The method comprises the steps as described below.

At step S410, the router receives, from an IPv4 compliant device connected to the IPv4 network, a request for an IPv6 network resource enabled by an IPv6 compliant device connected to the IPv6 network. Taking the scenario in FIG. 1 as an example, the router receives the request for the IPv6 network resource, such as the resource 'sensors/temp1,' from the IPv4 compliant device 130.

At step S420, the router obtains from a first resource directory an external IPv4 address and an external IPv4 port number corresponding to the IPv6 network resource. The first resource directory comprises a name, an IPv6 address, and an IPv6 port, for the IPv6 network resource, the external IPv4 address, and the external IPv4 port number. For example, the first resource directory may comprise the RD table as shown in the upper portion of FIG. 3. For example, the IPv6 network resource may be indicated in a link format in the first source directory, e.g., 'sensors/temp1' or 'sensors/temp2' as shown in FIG. 1.

In an implementation, the external IPv4 address may be an IPv4 address of the router.

In another implementation, before step S410, the method 400 may further comprise storing the external IPv4 address and the external IPv4 port number corresponding to the IPv6 network resource in the first resource directory (not shown).

In yet another implementation, the method 400 may further comprising storing in the entry the IPv4 address and the IPv4 port number of the IPv4 compliant device (not shown).

At step S430, the router creates an entry in a network address translation table for enabling communication between the IPv4 compliant device and the IPv6 network resource. The entry comprises the external IPv4 address, the external IPv4 port number, the IPv6 address and the IPv6 port number for the IPv6 network resource, the IPv4 address and an IPv4 port for the IPv4 compliant device and the internal IPv6 address and the IPv6 port number for the IPv4 compliant device. For example, the network address translation table may be represented by the NAT table in the lower portion of FIG. 3.

At step S440, the router transmits the external IPv4 address and the external IPv4 port number to the IPv4 compliant device.

Figure 5:
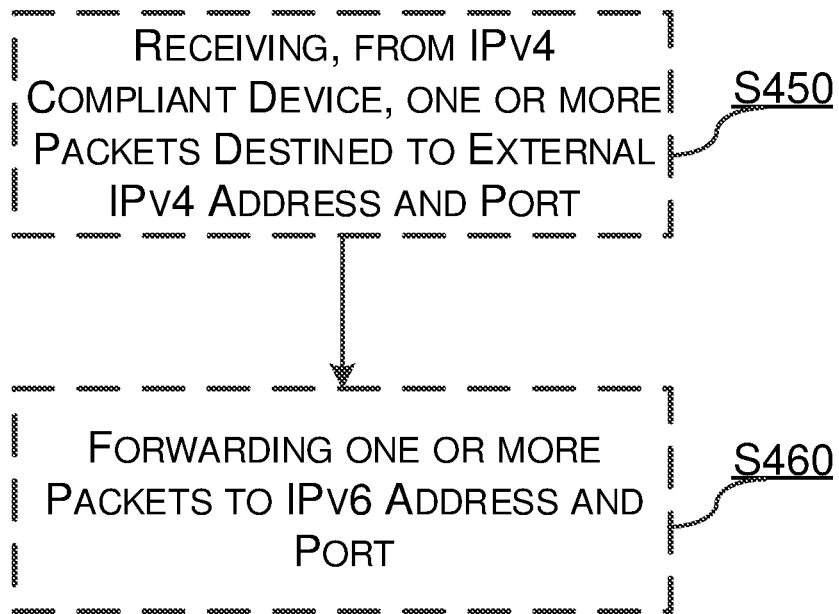

Optionally, the method 400 may further comprise steps S450 and S460 as shown in FIG. 5.

At step S450, the router receives, from the IPv4 compliant device, one or more packets destined to the external IPv4 address and external IPv4 port.

At step S460, the router forwards the one or more packets to the IPv6 address and the IPv6 port of the IPv6 network resource.

Figure 6:
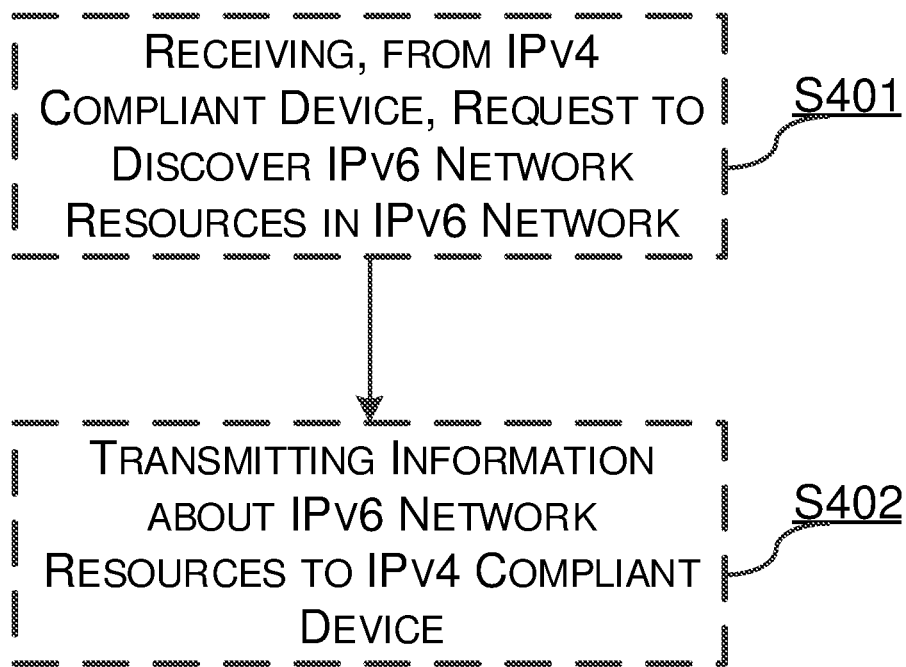

Before step S410, the method 400 may optionally comprise steps S401 and S402 as shown in FIG. 6.

At step S401, the router receives, from the IPv4 compliant device, a request to discover IPv6 network resources in the IPv6 network. The router may receive the network resources of the IPv6 network from the RD.

At step S402, the router transmits information about at least one of the IPv6 network resources to the IPv4 compliant device.

With the method 400, the present disclosure allows an IPv4 compliant device to establish communications with an IPv6 compliant device behind a NAT. That is, the method 400 provides means for an IPv4 network to discover IoT resources of an IPv6 network that is behind a NAT.

In an implementation, the first resource directory has a first identifier. The method 400 may further comprise an optional step of transmitting the first identifier to the IPv4 compliant device (not shown). In such an implementation, for example, the first identifier may be transmitted to the IPv4 compliant device in an HTTP message or a CoAP message. The use of the first identifier can differentiate a RD among several RDs having the same link format for different resources.

Figure 7:
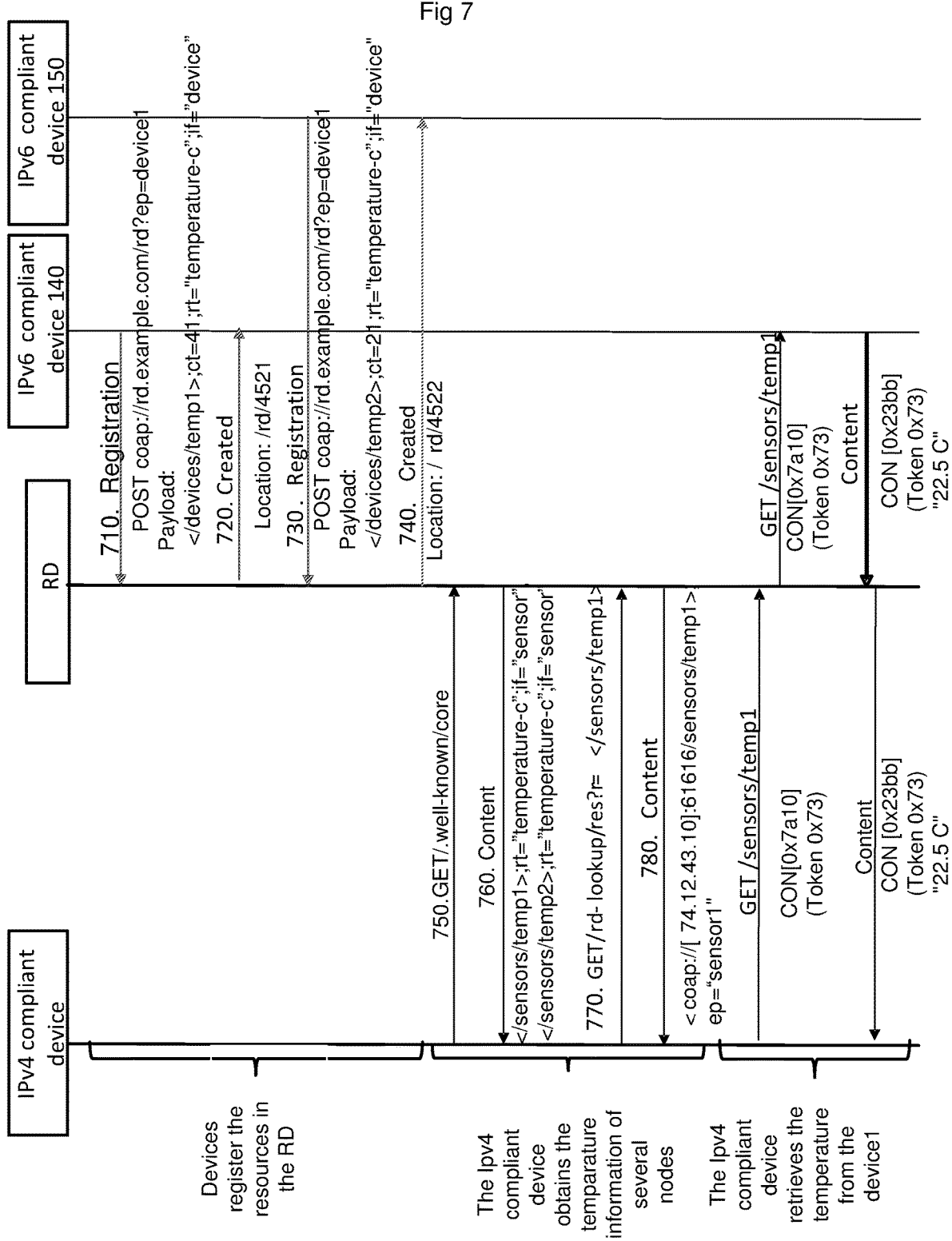
FIG. 7 is a sequence diagram illustrating how IoT resources of the IPv6 network can be made reachable from the IPv4 network in the scenario as shown in FIG. 1.

FIG. 7 is a sequence diagram illustrating how IoT resources of the IPv6 network 110 can be made reachable from the IPv4 network 120 in the scenario as shown in FIG. 1. Although FIG. 7 is exemplified in the scenario of FIG. 1, it would be appreciated by those skilled in the art that it is also applicable to any other scenario involving interconnections between two networks having different IP address formats.

Initially, the IPv6 compliant devices 140 and 150 in the IPv6 network 110 register their resources to the router, e.g., in the RD. In particular, the IPv6 compliant device 140 registers its resource with link format 'sensors/temp1' (operation 710). After the registration, the router generates an ID and assigns an IPv4 address and unallocated port to the resource (operation 720). The corresponding information of the resource would be <4521, sensors/temp1, 74.12.43.10, 61616, FE80::8329>. The IPv6 compliant device 150 does the same and registers its resource with link format 'sensors/temp2' (operation 730). The router generates another ID and assigns a different IPv4 address and port for that resource and stores it in the RD table, e.g., as shown in FIG. 3 (operation 740). The information of the resource would be <4522, sensors/temp2, 74.12.43.10, 61617, FE80::8359>

Thereafter, there is a node from the IPv4 network (e.g., the IPv4 compliant device 130) wants to discover resources of the IPv6 network 110 by requesting a '/.well-known/core' (operation 750) to the RD. The router sends back all the resources of the IPv6 network in a payload message (operation 760) and then the node decides to lookup for the IP information of the resource with web link format 'sensors/temp1' (operation 770). The router returns the IP information of that resource (<coap://74.12.43.10:61616/sensors/temp1>) but instead of providing the IPv6 address to the node, the router provides the IPv4 address and port assigned to that resource in the RD table (operation 780). Thereby, the router will be responsible to route the message from the IPv4 address and port combination 74.12.43.10:61616 to the right node in the constrained network and vice versa.

Each time there is a packet from the IPv4 network with a destination address/port matching with an entry in the NAT table, e.g., as shown in FIG. 3, the corresponding IPv6 address is extracted from the NAT table. If the IPv4 compliant device is a new one, a new entry is generated in the NAT table. This entry copies the information of the RD table, but also comprises the IPv4 address of the initiating host and the address of the router. This entry is needed for returning traffic back to the IPv4 host.

The traffic is then routed using the NAT table. For an IPv4 packet received, an IPv6 packet is generated with the same contents but with the destination address of the address from the NAT table. The source address is the IPv6 address of the router. The IPv6 compliant device sees the traffic as if it was coming from the router, thus, also replies to messages will be sent back to the router. For returning packets, the router again consults the NAT table, extracting the corresponding IPv4 address and port, and generates an IPv4 packet sent to the IPv4 address in the NAT table. In this way, the network address translation is transparent to both the IPv4 compliant device and the IPv6 compliant device.

Under some circumstances, an IPv4 network could have several IPv6 networks attached to it. In this situation, every IPv6 network would have its own RD in its router and, eventually, a node in the IPv4 network will not be able to differentiate from which IPv6 network the resources belong to. Besides that, if two different IPv6 networks happen to have two resources with the same resource name, the nodes in the IPv4 networks will not be able to differentiate to which node they are communicating with.

In consideration of this situation, the present disclosure proposes to make each RD have a unique identifier to differentiate resources within their networks. The identifier could be chosen from the unique MAC address of the route or randomly selected by a network administrator. The RD could replace the link format of a resource with the unique identifier of the router, e.g., replacing 'sensors/temp1' with [08:00:34:12:11:34]/sensors/temp1. Alternatively, the unique identifier of the RD may be comprised inside responses of messages, for instance:

```
Req: GET coap://.well-known/core
    Res: 2.05 Content
        </rd>;id="08:00:69:02:01:FC",
        </sensors/temp>;ct=41;rt="temperature-c";if="sensor",
        </sensors/light>;ct=41;rt="light-lux";if="sensor"
```

In the example above, the </rd> includes the unique identifier of the RD. Although the above example is explained by taking a CoAP message as an example, it would be appreciated by those skilled in the art that an HTTP message or any other appropriate message could be used here for signaling the unique identifier.

Figure 8:
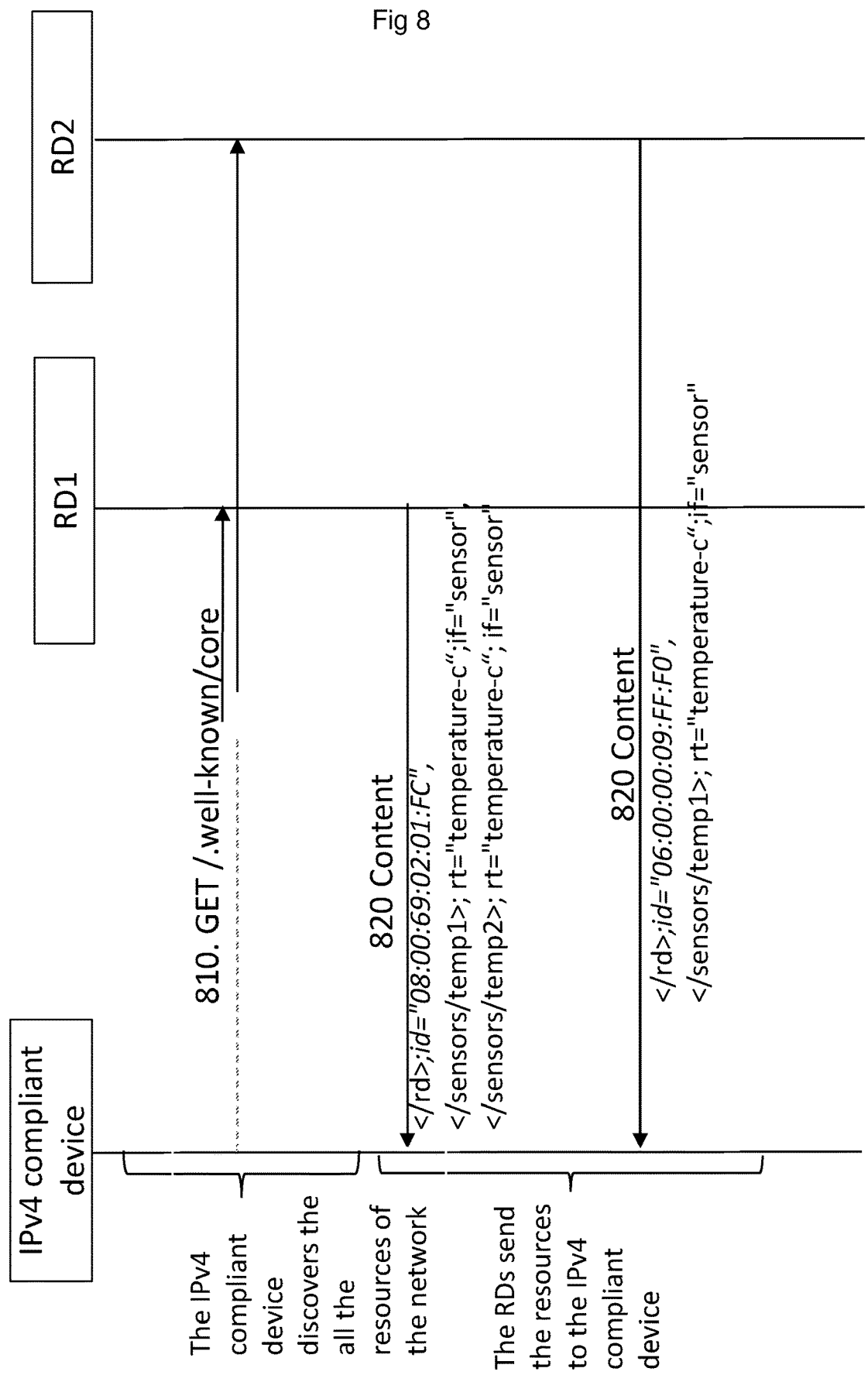
FIG. 8 is a sequence diagram illustrating related operations in an example of discovering two resource directories (RDs) and obtaining their resources.

FIG. 8 is a sequence diagram illustrating related operations in an example of discovering two resource directories (RDs) and obtaining their resources. The two RDs have the same link format (e.g., 'sensors/temp1') for different resources.

The operations for an IPv4 compliant device discovering resources of an IPv6 network are similar to operation 750 as illustrated in FIG. 7, and thus will be omitted here. The difference from the method 400 mainly lies in operation 820.

At operation 820, each RD sends, to the IPv4 compliant device, the information assigned to the resources in the RD table as well as a unique identifier of the RD.

As an example, RD1 may send the following information to the IPv4 compliant device:

```
</rd>;id="08:00:69:02:01:FC ",
</sensors/temp1>; rt="temperature-c";if="sensor",
</sensors/temp2>; rt=" temperature-c";if="sensor"
```

As another example, RD2 may send information to the IPv4 compliant device as follows:

```
</rd>;id="06:00:00:09:FF:F0 ",
</sensors/temp1>; rt="temperature-c";if="sensor"
```

In this case, the IPv4 compliant device is able to differentiate the resources because the messages send by both RDs comprise respective unique identifier in the </rd> field. Thus, the IPv4 compliant device that receives resources with the same name from different RDs will be able to differentiate them.

Figure 9:
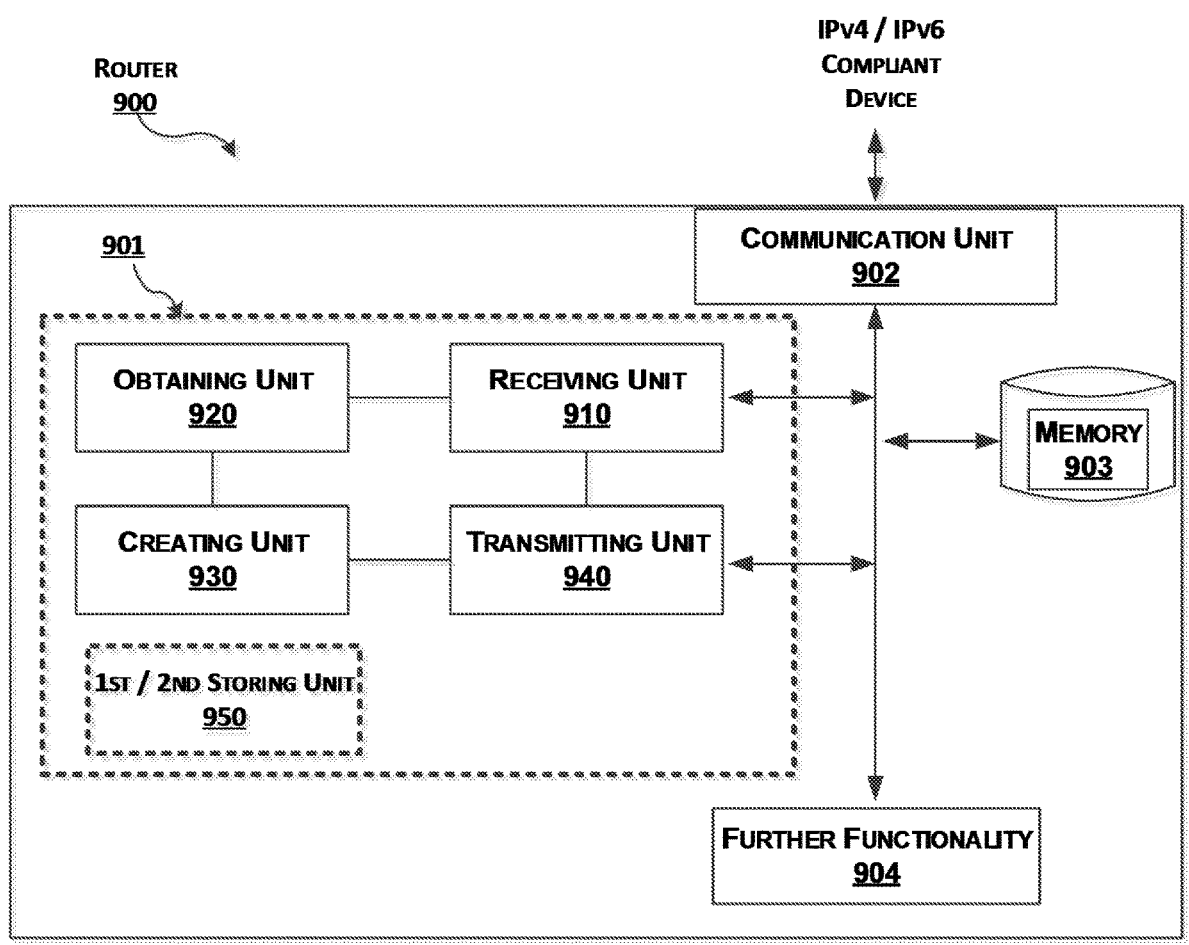
FIG. 9 is a schematic diagram of a router for connecting an IPv6 network and an IPv4 network, according to an embodiment described herein.

FIG. 9 is a schematic diagram of a router 900 for connecting an IPv6 network and an IPv4 network according to an embodiment of the present disclosure. For example, the router 900 may be the router 100 as shown in FIG. 1, and then the IPv6 network and the IPv4 network may be the IPv6 network 110 and the IPv4 network 120 as shown in FIG. 1.

The part of the router 900 which is most affected by the adaptation to the herein described method, e.g., the method 400, is illustrated as an arrangement 901, surrounded by a dashed line. The router 900 and arrangement 901 are further configured to communicate with other entities such as an IPv4 compliant device or an IPv6 compliant device via a communication unit 902 which may be regarded as part of the arrangement 901. The communication unit 902 comprises means for wireless communication. The arrangement 901 or the router 900 may further comprise other functional units 904, such as functional units providing regular routing functions, and may further comprise one or more memories 903.

The arrangement 901 could be implemented, e.g., by one or more of: a processor or a microprocessor and adequate software and memory for storing of the software, a Programmable Logic Device (PLD), or other electronic component(s) or processing circuitry configured to perform the actions described above, and illustrated, e.g., in FIG. 4. The arrangement part of the router 900 may be implemented and/or described as follows.

Referring to FIG. 9, the router 900 may comprise a receiving unit 910, an obtaining unit 920, a creating unit 930, a transmitting unit 940, a first storing unit and a second storing unit (uniformly denoted as 950). The first storing unit and the second storing unit are optional.

The receiving unit 910 is configured to receive, from an IPv4 compliant device connected to the IPv4 network, a request for an IPv6 network resource enabled by an IPv6 compliant device connected to the IPv6 network.

The obtaining unit 920 is configured to obtain from a first resource directory an external IPv4 address and an external IPv4 port number corresponding to the IPv6 network resource. The first resource directory comprises a name, an IPv6 address, and an IPv6 port, for the IPv6 network resource, the external IPv4 address, and the external IPv4 port number, e.g., as shown in the upper portion of FIG. 3. For example, the IPv6 network resource may be indicated in a link format in the first source directory, e.g., 'sensors/temp1' or 'sensors/temp2' as shown in FIG. 1.

In an implementation, the external IPv4 address may be an IPv4 address of the router.

In another implementation, the first storing unit 950 is configured to store the external IPv4 address and the external IPv4 port number corresponding to the IPv6 network resource in the first resource directory, before receiving the request for the IPv6 network resource.

In yet another implementation, the second storing unit is configured to store the IPv4 address and the IPv4 port number of the IPv4 compliant device.

The creating unit 930 is configured to create an entry in a network address translation table for enabling communication between the IPv4 compliant device and the IPv6 network resource. The entry comprises the external IPv4 address, the external IPv4 port number, the IPv6 address and the IPv6 port number for the IPv6 network resource, and an IPv4 address and an IPv4 port for the IPv4 compliant device, e.g., as shown in FIG. 3.

In an implementation, the entry comprises an internal IPv6 address and an internal IPv6 port for the IPv6 network resource. Alternatively, the entry in the network address translation table comprises an external IPv4 address and an external IPv4 port for the IPv6 network resource.

In an implementation, the first resource directory and the network address translation table may be comprised in the router, e.g., as shown in FIG. 1.

The transmitting unit 940 is configured to transmit the external IPv4 address and the external IPv4 port number to the IPv4 compliant device.

In an implementation, the receiving unit 910 is further configured to receive, from the IPv4 compliant device, one or more packets destined to the IPv4 external address and the IPv4 external port. In this implementation, the transmitting unit 940 is further configured to forward the one or more packets to the IPv6 address and the IPv6 port of the IPv6 network resource.

In another implementation, the receiving unit 910 is further configured to receive, from the IPv4 compliant device, a request to discover IPv6 network resources in the IPv6 network, before receiving the request for the IPv6 network resource. In such an implementation, the transmitting unit 940 is further configured to transmit information about at least one of the IPv6 network resources to the IPv4 compliant device.

In yet another implementation, the first resource directory has a first identifier. In this case, the transmitting unit 940 is further configured to transmit the first identifier to the IPv4 compliant device.

As an example of this implementation, the first identifier may be transmitted to the IPv4 compliant device in an HTTP message or a CoAP message. Alternatively, the first identifier may be a part of the link format for the IPv6 network resource.

As another example of this implementation, the router is connected to at least one further IPv6 network and comprises a second resource directory of IPv6 network resources in the further IPv6 network. Moreover, the second resource directory has a second identifier being different from the first identifier. Then, the first resource directory may be differentiated from the second resource directory.

It should be noted that two or more different units in this disclosure may be logically or physically combined. For example, the receiving unit 910 and the transmitting unit 940 may be combined as one single unit, e.g., a transceiver in the router.

Figure 10:
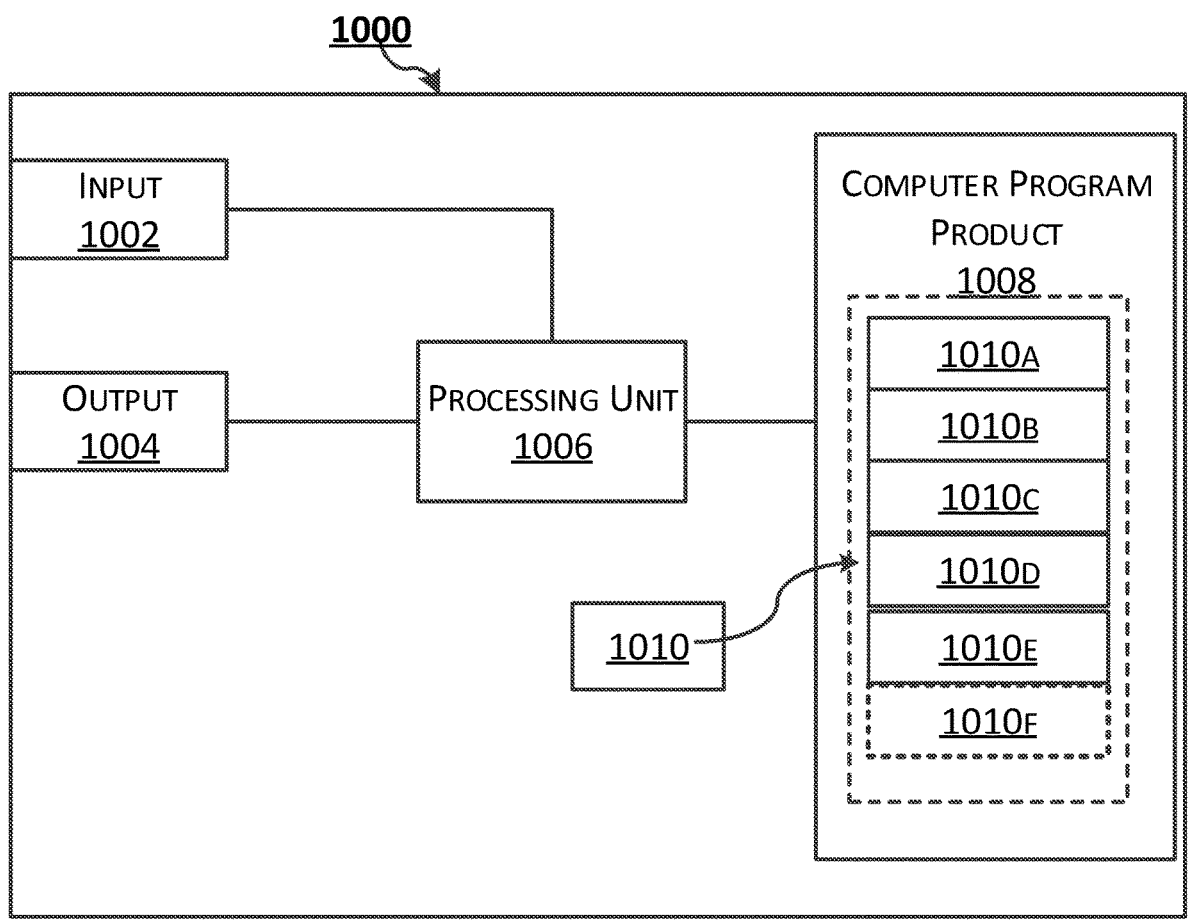
FIG. 10 schematically shows an embodiment of an arrangement comprising at least one particular computer program product according to a particular embodiment described herein.

FIG. 10 schematically shows an embodiment of an arrangement 1000 comprising at least one particular computer program product 1008 according to a particular embodiment described herein. The arrangement 1000 may be used in the router 900 described hereinbefore. Comprised in the arrangement 1000 is a processing unit 1006, e.g., a Digital Signal Processor (DSP). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit and the output unit may be arranged as an integrated entity or as illustrated in the example of FIG. 9.

Furthermore, the at least one computer program product 1008 may be in the form of a non-volatile or volatile memory, e.g., an Electrically Erasable Programmable Read-Only Memory (EEPROM), a flash memory, and a hard drive. The computer program product 1008 comprises a computer program 1010, which comprises code/computer readable instructions, which when executed by the processing unit 1006 in the arrangement 1000 causes the arrangement 1000 and/or the router in which it is comprised to perform the actions, e.g., of the procedure described earlier in conjunction with FIG. 4.

The computer program 1010 may be configured as a computer program code structured in computer program modules 1010A-1010F. Hence, in an exemplifying embodiment when the arrangement 1000 is used in the router 900, the code in the computer program of the arrangement 1000 comprises a receiving module 1010A, for receiving, from an IPv4 compliant device connected to the IPv4 network, a request for an IPv6 network resource enabled by an IPv6 compliant device connected to the IPv6 network. The code in the computer program 1010 further comprises an obtaining module 10106, for obtaining from a first resource directory an external IPv4 address and an external IPv4 port number corresponding to the IPv6 network resource. The first resource directory comprises a name, an IPv6 address and an IPv6 port for the IPv6 network resource, and the external IPv4 address, and the external IPv4 port number. The code in the computer program 1010 may further comprise a creating module 1010C, for creating an entry in a network address translation table for enabling communication between the IPv4 compliant device and the IPv6 network resource. The entry comprises the external IPv4 address, the external IPv4 port number, the IPv6 address and the IPv6 port number for the IPv6 network resource, and an IPv4 address and an IPv4 port for the IPv4 compliant device. The code in the computer program 1010 may further comprise a transmitting module 1010D, for transmitting the external IPv4 address and the external IPv4 port number to the IPv4 compliant device. The code in the computer program 1010 may further comprise a transmitting module 1010E, for storing the external IPv4 address and the external IPv4 port number corresponding to the IPv6 network resource in the first resource directory, before receiving the request for the IPv6 network resource, or for storing the IPv4 address and IPv4 port number of the IPv4 compliant device.

The code in the computer program 1010 may comprise further modules, illustrated as module 1010F, e.g. for controlling and performing other related procedures associated with the router's operations.

The computer program modules could essentially perform the actions of the flow illustrated in FIG. 4, to emulate the router 900. In other words, when the different computer program modules are executed in the processing unit 1006, they may correspond, e.g., to the units 910-950 of FIG. 9.

Although the code means in the embodiments disclosed above in conjunction with FIG. 10 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU, but could also comprise two or more processing units. For example, the processor may comprise general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the router.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

ABBREVIATIONS

6LoWPAN IPv6 over Low power Wireless Personal Area Networks
ASIC Application Specific Integrated Circuit
CoAP Constrained Application Protocol
CPU Central processing unit
DSP Digital Signal Processor
EEPROM Electrically Erasable Programmable Read-Only Memory
HTTP Hypertext Transfer Protocol
IETF Internet Engineering Task Force
IoT Internet of Things
IP Internet Protocol
IPv4 Internet Protocol Version 4
IPv6 Internet Protocol Version 6
NAT Network Address Translation
ND Neighbor Discovery
PLD Programmable Logic Device
RAM Random-Access Memory
RD Resource Directory
REST Representational State Transfer
ROM Read-Only Memory
UDP User Datagram Protocol

The invention claimed is:

1. A method performed by a router connected to an Internet Protocol Version 6 (IPv6) network and an Internet protocol Version 4 (IPv4) network, the method comprising:
   receiving, from an IPv4 compliant device connected to the IPv4 network, a request for an IPv6 network resource enabled by an IPv6 compliant device connected to the IPv6 network;
   obtaining from a first resource directory an external IPv4 address and an external IPv4 port number corresponding to the IPv6 network resource, the first resource directory comprising a name, a local IPv6 address, and a local IPv6 port, for the IPv6 network resource, the external IPv4 address, and the external IPv4 port number;
   creating an entry in a network address translation table for enabling communication between the IPv4 compliant device and the IPv6 network resource, the entry comprising the external IPv4 address, the external IPv4 port number, the local IPv6 address and the local IPv6 port number for the IPv6 network resource, and a local IPv4 address and a local IPv4 port for the IPv4 compliant device; and
   transmitting the external IPv4 address and the external IPv4 port number to the IPv4 compliant device.

2. The method of claim 1, wherein the external IPv4 address is an IPv4 address of the router.

3. The method of claim 1, wherein, before receiving the request for the IPv6 network resource, the method further comprises:
   storing the external IPv4 address and the external IPv4 port number corresponding to the IPv6 network resource in the first resource directory.

4. The method of claim 1, further comprising storing in the entry the local IPv4 address and the local IPv4 port number of the IPv4 compliant device.

5. The method of claim 1, further comprising:
   receiving, from the IPv4 compliant device, one or more packets destined to the external IPv4 address and the external IPv4 port; and
   forwarding the one or more packets to the local IPv6 address and the local IPv6 port of the IPv6 network resource.

6. The method of claim 1, wherein the method further comprises, before receiving the request for the IPv6 network resource:

receiving, from the IPv4 compliant device, a request to discover IPv6 network resources in the IPv6 network; and transmitting information about at least one of the IPv6 network resources to the IPv4 compliant device.

7. The method of claim 1, wherein the IPv6 network resource is indicated in a link format in the first resource directory.

8. The method of claim 1, wherein the first resource directory has a first identifier, and the method further comprises transmitting the first identifier to the IPv4 compliant device.

9. The method of claim 8, wherein the first identifier is transmitted to the IPv4 compliant device in a Hypertext Transfer Protocol, HTTP, message or a Constrained Application Protocol, CoAP, message.

10. A router for connecting an Internet Protocol Version 6 (IPv6) network and an Internet Protocol Version 4 (IPv4) network, the router comprising:
a processor; and
a memory storing instructions configured so that when executed on the processor, the instructions cause the router to:
receive, from an IPv4 compliant device connected to the IPv4 network, a request for an IPv6 network resource enabled by an IPv6 compliant device connected to the IPv6 network;
obtain from a first resource directory an external IPv4 address and an external IPv4 port number corresponding to the IPv6 network resource, the first resource directory comprising a name, a local IPv6 address, and a local IPv6 port, for the IPv6 network resource, the external IPv4 address, and the external IPv4 port number;
create an entry in a network address translation table for enabling communication between the IPv4 compliant device and the IPv6 network resource, the entry comprising the external IPv4 address, the external IPv4 port number, the local IPv6 address and the local IPv6 port number for the IPv6 network resource, and a local IPv4 address and a local IPv4 port for the IPv4 compliant device; and
transmit the external IPv4 address and the external IPv4 port number to the IPv4 compliant device.

11. The router of claim 10, wherein the external IPv4 address is an IPv4 address of the router.

12. The router of claim 10, wherein the instructions are further configured so as to cause the router to, before receiving the request for the IPv6 network resource, store the external IPv4 address and the external IPv4 port number corresponding to the IPv6 network resource in the first resource directory.

13. The router of claim 10, wherein the instructions are further configured so as to cause the router to store in the entry the local IPv4 address and the local IPv4 port number of the IPv4 compliant device.

14. The router of claim 10, wherein the instructions are further configured so as to cause the router to:
receive, from the IPv4 compliant device, one or more packets destined to the external IPv4 address and the external IPv4 port; and
forward the one or more packets to the local IPv6 address and the local IPv6 port of the IPv6 network resource.

15. The router of claim 10, wherein the instructions are further configured so as to cause the router to, before receiving the request for the IPv6 network resource,
receive, from the IPv4 compliant device, a request to discover IPv6 network resources in the IPv6 network; and
transmit information about at least one of the IPv6 network resources to the IPv4 compliant device.

16. The router of claim 10, wherein the IPv6 network resource is indicated in a link format in the first resource directory.

17. The router of claim 10, wherein the first resource directory has a first identifier, and wherein the instructions are further configured so as to cause the router to transmit the first identifier to the IPv4 compliant device.

18. The router of claim 17, wherein the first identifier is transmitted to the IPv4 compliant device in a Hypertext Transfer Protocol, HTTP, message or a Constrained Application Protocol, CoAP, message.

19. The router of claim 17, wherein the first identifier is a part of the link format for the IPv6 network resource.

20. A non-transitory computer-readable medium comprising, stored thereupon, a computer program product comprising a computer program, wherein the computer program comprises instructions configured so that, when executed on a router connected to an Internet Protocol Version 6 (IPv6) network and an Internet protocol Version 4 (IPv4) network, the instructions configure the router to:
receive, from an IPv4 compliant device connected to the IPv4 network, a request for an IPv6 network resource enabled by an IPv6 compliant device connected to the IPv6 network;
obtain from a first resource directory an external IPv4 address and an external IPv4 port number corresponding to the IPv6 network resource, the first resource directory comprising a name, a local IPv6 address, and a local IPv6 port, for the IPv6 network resource, the external IPv4 address, and the external IPv4 port number;
create an entry in a network address translation table for enabling communication between the IPv4 compliant device and the IPv6 network resource, the entry comprising the external IPv4 address, the external IPv4 port number, the local IPv6 address and the local IPv6 port number for the IPv6 network resource, and a local IPv4 address and a local IPv4 port for the IPv4 compliant device; and
transmit the external IPv4 address and the external IPv4 port number to the IPv4 compliant device.

\* \* \* \* \*